United States Patent

[11] 3,612,102

| | | | | |
|---|---|---|---|---|
| [72] | Inventor | Eldon E. Hulsey<br>P. O. Box 533, Conroe, Tex. 77301 | | |
| [21] | Appl. No. | 29,886 | | |
| [22] | Filed | Apr. 20, 1970 | | |
| [45] | Patented | Oct. 12, 1971<br>Continuation-in-part of application Ser. No. 699,947, Jan. 23, 1968, now Patent No. 3,558,100, which is a continuation-in-part of application Ser. No. 604,414, Dec. 23, 1966, now Patent No. 3,443,793. | | |

[54] ROTARY CONTROL VALVE
6 Claims, 10 Drawing Figs.

[52] U.S. Cl. .................................................. 137/625.3,
  251/207, 251/209, 251/310
[51] Int. Cl. ...................................................... F16k 5/10

[50] Field of Search ................................................ 251/205–209,
  309–312

[56] References Cited
  UNITED STATES PATENTS

| 1,638,152 | 8/1927 | Gabriel ........................ | 251/209 |
| 3,240,466 | 3/1966 | Meyer ......................... | 251/205 X |

FOREIGN PATENTS

| 620,068 | 5/1961 | Canada ........................ | 251/309 |

Primary Examiner—Arnold Rosenthal
Attorney—R. Werlin

ABSTRACT: A rotary control valve of the hollow plug or ball type having spiral variable area orifice flow ports in combination with an uninterrupted full-open through-conduit passage adapted to permit selective and variable control of fluid flow over a wide range of settings while maintaining at all settings substantially straight-line or through-conduit flow.

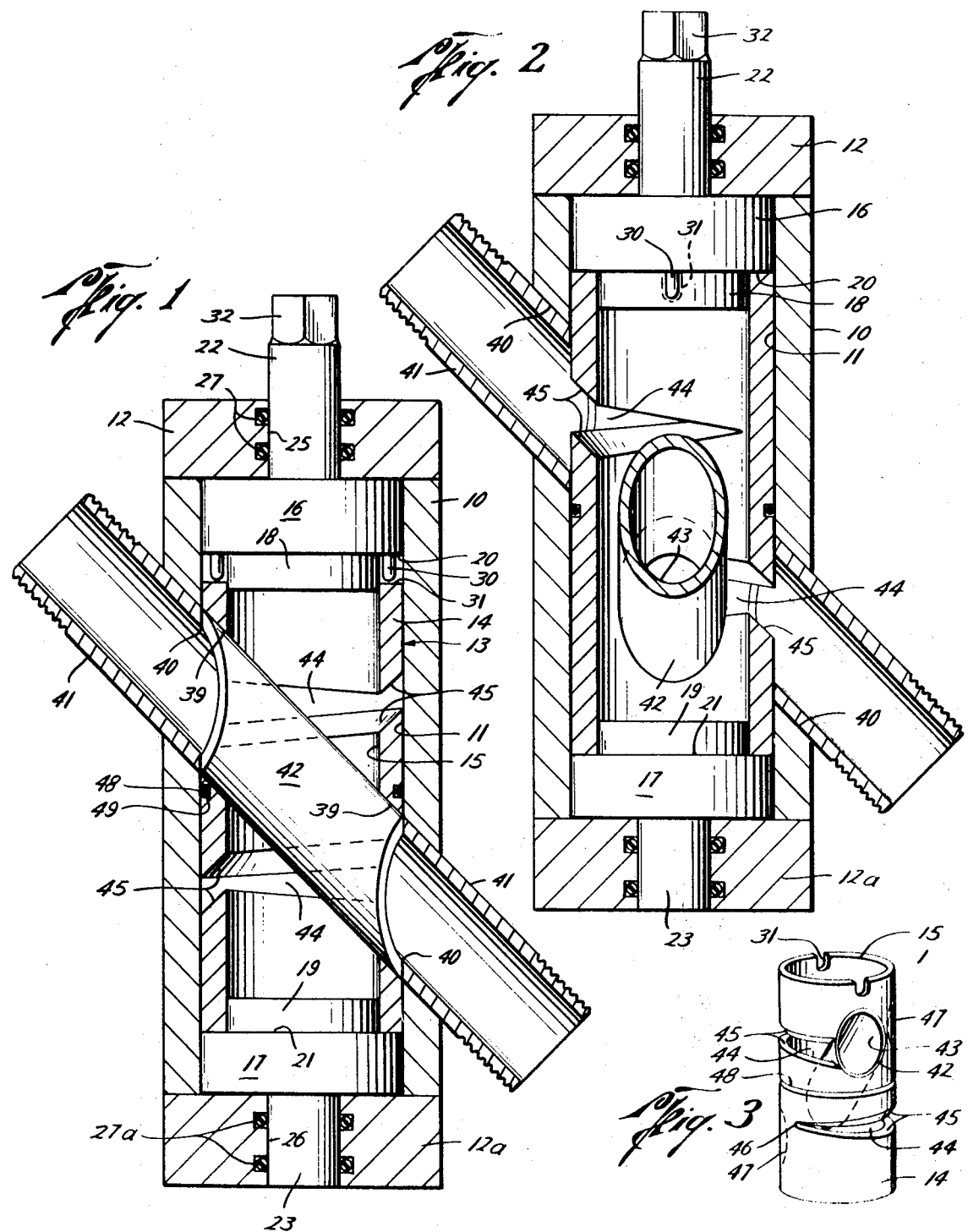

Eldon E. Hulsey
INVENTOR.

BY

ATTORNEY

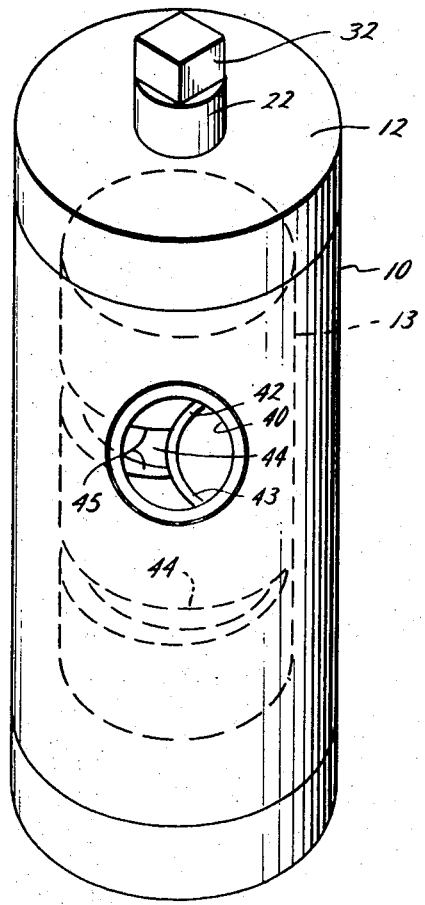
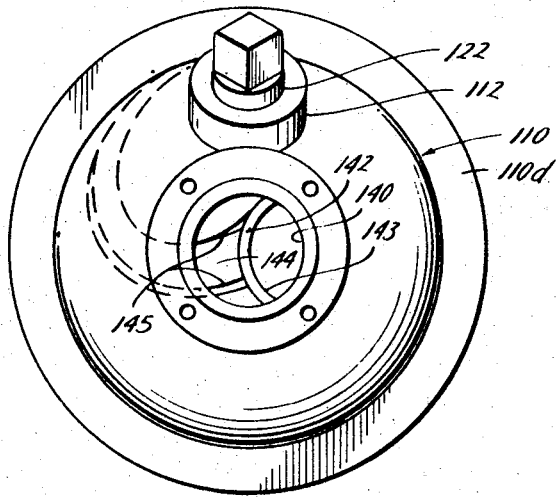
Eldon E. Hulsey
INVENTOR

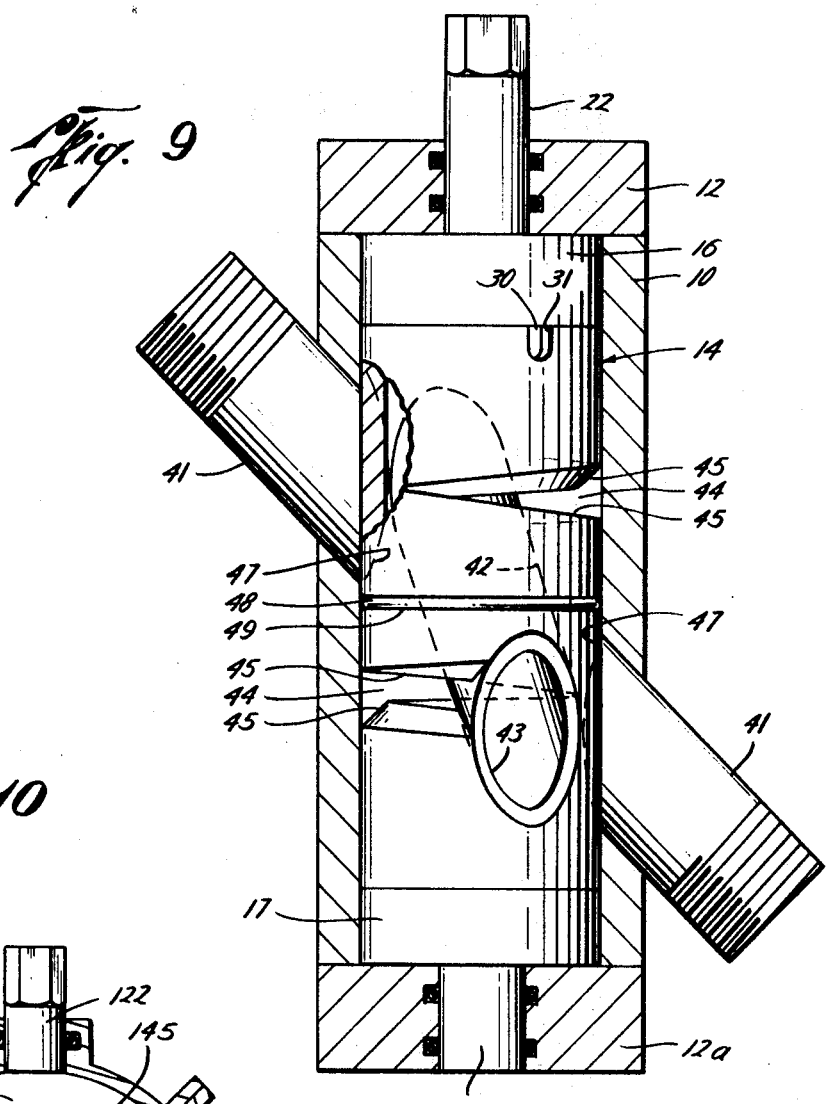
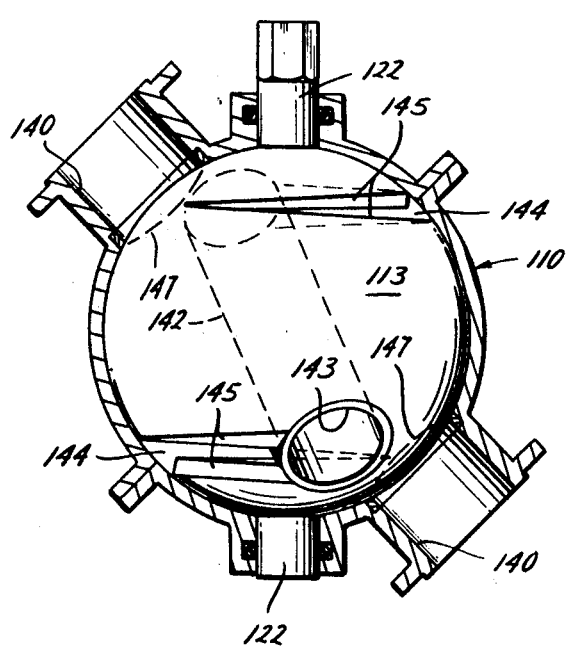
Eldon E. Hulsey
INVENTOR.

ROTARY CONTROL VALVE

RELATED APPLICATIONS

This application is a continuation-in-part of my copending application Ser. No. 699,947 filed Jan. 23, 1968, now U.S. Pat. No. 3,558,100, which is in turn, a continuation-in-part of an earlier application, Ser. No. 604,414, filed Dec. 23, 1966, now U.S. Pat. No. 3,443,793.

In the aforesaid U.S. Pat. No. 3,443,793, I have disclosed a form of rotary control valve which comprises a casing defining a closure-receiving chamber having spaced openings in the casing communicating with the chamber to define a flowway therethrough disposed at an acute angle to a main axis of the chamber, a closure member rotatably disposed in said chamber and comprising a body shaped to fit the chamber and having an axis of rotation coaxial with said chamber axis, and a flow passage extending through the closure body at said acute angle with respect to said axis of rotation, whereby to be in register with said openings at the flowway-open position of the closure member.

In the aforesaid control valve the flow passage through the closure member is defined at one or both ends by elongate slots extending circumferentially of the body, the slots being formed by convergent walls which are inclined so as to intersect the flow passage through the closure member at an acute angle to the axis of the passage The slot or slots, so-shaped and inclined, are designed, when the closure member is rotated, to cooperate with the angularly disposed flowway to vary the effective cross-sectional area of the flowway in accordance with the angular position of the slotted ends of the flow passage relative to the flowway openings while maintaining substantially straight-line or through-conduit flow through the flowway at all valve-open positions.

In a principal embodiment of the patent, the closure member was in the form of a substantially solid body through which a flow passage was formed having the disclosed novel configuration. In the disclosure of copending application Ser. No. 699,947, the closure member is in the form of a tubular sleeve or body having a flow passage therethrough possessing the same characterizing slot features of the corresponding embodiments of the patented valve. By employing a sleeve-type body rather than a substantially solid body, it was found that manufacture of the valve was greatly simplified, the weight and cost correspondingly reduced, and the cost of replacement of the closure member, where required, was greatly reduced, without sacrifice of the novel flow characteristics of the valve.

In the present application, the closure or control member is of the same hollow construction as that disclosed in Ser. No. 699,947 and employs the spiral characterizing slots for varying the orifice area of the flow passage through the control member. However, the flow passage through the latter now includes an uninterrupted tubular sleeve or conduit defining a full-open, through-conduit passage which extends through the interior of the hollow control member at an acute angle with respect to its axis of rotation so that the ends of the conduit will be in register with the flowway openings in the valve casing when the control member is in the full flowway-open position, through which the total flow of fluid is confined. The larger ends of the variable orifice slots terminate immediately adjacent the opposite ends of the conduit and extend in opposite directions circumferentially of the body of the control member.

By providing the through-conduit passage through a hollow control member, several benefits result in the operation of a variable area orifice valve of the type herein contemplated. In particular, in the full-open position, minimum pressure drop in the fluid flow will be experienced because the total fluid flow through the conduit and the flowway openings of the valve is perfectly straight, unlike more conventional regulating valves in which the fluid flow path involves various changes in direction between the inlet and outlet, even in the full-open position.

Moreover, by the combination of the variable area slots and the straight through-flow conduit, fluid flow through the valve will be on substantially straight lines at any other valve-open position, thus minimizing pressure drop at such positions, while providing a wide range of flow control.

Other and more specific objects and advantages of this invention will become more readily apparent from the following detailed description when read in conjunction with the accompanying drawing which illustrates useful embodiments in accordance with this invention.

In the drawing:

FIG. 1 is a longitudinal, partly sectional view of a plug-type control valve in accordance with one embodiment of this invention, the valve being shown in the fully open position;

FIG. 2 is a view similar to FIG. 1 showing the valve in a partly open position;

FIG. 3 is an elevational view in perspective of the control or closure member of the valve shown in FIG. 1;

FIG. 7 is an elevational view in perspective of the plug-type valve shown in FIG. 1, to illustrate the position of the flow passage in the closure member relative to the valve casing opening when the closure member is in the partly open position;

FIG. 8 is an elevational view in perspective of the ball-type valve shown in FIG. 4 to illustrate the position of the flow passages relative to the valve casing opening when the closure member is in the partly open position;

FIG. 9 is a longitudinal partly sectional view similar to FIG. 1 showing the closure member in the fully closed position; and FIG. 10 is a vertical partly sectional view similar to FIG. 4 showing the closure member in the fully closed position.

Figure 4:
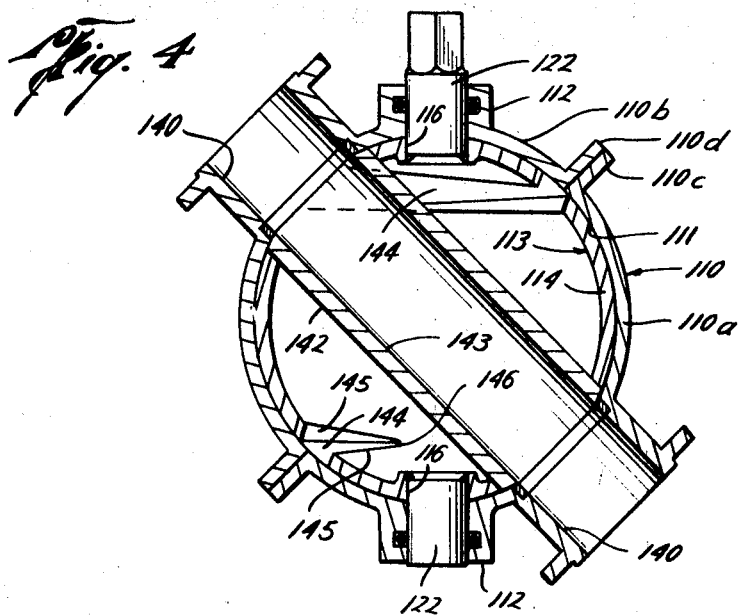
FIG. 4 is a vertical cross-sectional view of a ball-type control valve in accordance with another embodiment of this invention, the valve being shown in fully open position.

Referring first to the plug-type embodiment illustrated in FIGS. 1 to 3, 7 and 9, the valve includes a casing 10 having a generally cylindrical bore defining a closure-receiving chamber 11. The ends of casing 10 are closed by means of bonnet members 12 and 12a removably secured thereto in any conventional manner (not shown). Chamber 11 is adapted to receive a control or closure member, designated generally by the numeral 13, and comprising a tubular body 14, having an axial bore 15, snugly fitting the bore wall of chamber 11 and disposed for rotation therein, the wall forming a seat for the closure member.

The opposite ends of body 14 are closed by removable end plugs 16 and 17 having external diameters to be flush with the exterior of body 14 and having reduced diameter cylindrical extensions 18 and 19, respectively, dimensioned to have a snug sliding fit in bore 15 of body 14, and defining the inwardly facing annular shoulders 20 and 21, respectively, adapted to abut the adjacent ends of body 14. With the end plugs in place, the overall length of closure member 13 will be made such as to fit snugly between the opposed inner faces of bonnet members 12 and 12a.

End plugs 16 and 17 are provided with oppositely extending cylindrical stems or trunnions 22 and 23, respectively, of identical cross section, coaxial with each other and with the longitudinal axis of body 14. Trunnions 22 and 23 are journaled in coaxial openings 25 and 26 of the respective bonnet members 12 and 12a. Seal packings 27 and 27a are mounted in openings 25 and 26, respectively, to seal about the respective trunnions.

One of the end plugs, plug 16 for example, may be constituted the drive member for rotating closure member 13, and to this end may be provided with one or more dowel pins or keys 30 (FIGS. 1 and 2) projecting from shoulder 20 alongside extension 18 for reception in matching slots 31 provided in the adjacent end of closure body 14. The outer end of stem 22 carries means, such as the flats 32, for connection to the stem of any conventional type of operator to be employed for rotating the closure member.

Plug 17, while it may be of identical construction to plug 16, is illustrated in a form in which trunnion 23 is made integral with the plug. By providing the closure body with the separable end plugs, it will be seen that replacement of the closure body is greatly simplified and the cost reduced.

Casing 10 is provided with registering openings 40—40 spaced 180° apart and disposed on an axis extending at an acute angle to the longitudinal axis of casing 10. Openings 40—40 define the inlet and outlet flow ports for the valve to which are connected the coaxial nozzles 41—41 defining the flowway through the valve and by means of which the valve may be connected into a flow conduit to be controlled by the valve. As so arranged the valve is of the so-called "angle" type, in that the main axis of the valve casing is disposed at an acute angle with respect to the longitudinal axis of the flow conduit in which it is mounted.

Closure member 13 is, as previously noted, of cylindrical, tubular shape and a tubular flow conduit 42, having an axial bore 43, extends through bore 15 at an acute angle with respect to the longitudinal axis of the closure member, so as to be coincident with the axis of the flowway through the valve when the closure member is in the valve-open position, as seen in FIG. 1. The opposite ends of conduit 42 are sealed into openings 39—39 at opposite points in the wall of the closure member.

A pair of orifice slots 44—44 extend generally circumferentially of body 14 of the closure member in opposite directions from points immediately adjacent the opposite ends of conduit 42. Each of the slots 44 is defined by walls 45—45 converging toward their trailing ends 46 and inclined inwardly of body 14 at angles such as to intersect the axis of conduit 42 at an acute angle which is substantially the same as that between the axis of the flowway through the valve and the main axis of chamber 11. In development, slot 44 will have an elongate, generally triangular configuration, the base of each slot being defined by the exterior wall of the adjacent end of conduit 42, and the apex by trailing end 46. In general the angular length of each slot 44 will be greater than 90° and preferably from about 180° to about 270°. This extended length of the slot will permit rotation of the closure member through an angle of up to about 270° between its fully closed and fully open positions, thereby providing an extended range of variation in the orifice area for accurately controlling flow of fluid through the valve. The nonslotted portion of body 14 between each trailing end 46 of a slot and the related end of conduit 42 define closure portions indicated at 47 (FIGS. 3 and 9) adapted to register with the related flow ports 40 in the flowway-closing position of the closure member. As disclosed in the aforementioned patent and copending application, closure portions 47 may be enclosed by suitable seal rings seated in the surface of body 14 and shaped to form fluidtight seals around each of the flow ports 40 when the valve is in the flowway-closing position, FIG. 9. A circumferential seal 48 is seated in a suitable groove 49 extending circumferentially about body 14 at its midpoint, whereby to seal off the closure chamber between the inlet and outlet ends thereof.

With a valve having the construction heretofore described, when fully open, the total fluid flow will be through conduit 42. Since conduit 42 will have substantially the same cross-sectional area as the flowway through the valve defined by inlet and outlet openings 40, fluid flow will encounter minimum pressure drop through the valve. At any other angular position of closure member 13 between the fully open and fully closed positions, at least a part of the fluid flow will be through the portions of slot 44 exposed to openings 40 (FIG. 2) and in some positions the flow will be partly through conduit 42 and partly through the exposed portions of slots 44 (FIG. 7). In any case, by reason of the described inclination of walls 45 defining slots 44 and the generally symmetrical arrangement disclosed, at any partially open position of the valve the fluid flow path through the valve will be substantially coaxial with the flowway through the valve, thus providing substantially straight-line flow through the valve at any opening with minimum pressure drop.

The straight-line flow provided by the described construction by reducing turbulence in the fluid flow, also greatly reduces the undesirable noise which commonly accompanies fluid flow through more conventional regulating valves.

Figure 5:
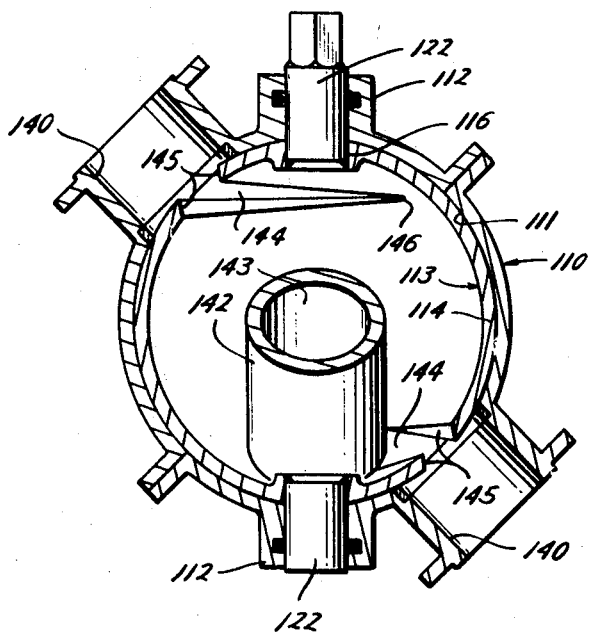
FIG. 5 is a view similar to FIG. 4 showing the valve in partly open position.
Figure 6:
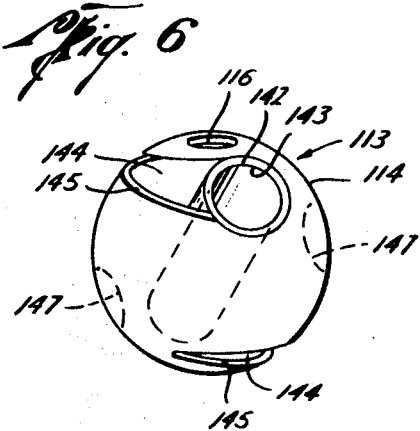
FIG. 6 is an elevational view in perspective of the closure member of the valve shown in FIG. 4.

FIGS. 4 to 6, inclusive, 8 and 10 illustrate another embodiment in accordance with this invention in which the closure member is generally ball-shaped.

As illustrated, a generally spherical casing, designated generally by the numeral 110, is constructed of two hemispherical segments 110a and 110b carrying annular mating flanges 110c and 110d respectively, adapted to be connected together by any conventional fastening means (not shown). The casing encloses a generally spherical closure-receiving chamber 111. Coaxially registering flow ports 140—140 communicate with chamber 111 on diametrically opposite sides of casing 110 to define a flowway through the casing.

A hollow ball-shaped closure member or plug, designated generally by the numeral 113, and comprising a body 114 is rotatably mounted in chamber 111 and is provided with a tubular flow conduit 142 having an axial bore 143 which extends diametrically of body 114, having its ends opening through the wall of the body and sealed thereto. Conduit 142 has its cross-sectional area substantially equal to that of the flowway defined by ports 140—140. When the closure member is rotated to the fully open position (FIG. 4) the ends thereof will be in registration with flow ports 140—140, and the longitudinal axis of conduit 142 will be coincident with that of the flowway through the valve casing.

A pair of generally triangular orifice slots 144 extend generally circumferentially of body 114 in opposite directions from points immediately adjacent the opposite ends of conduit 142, and are generally similar in shape and length to slots 44 in the previously described embodiment, being characterized also by walls 145 which are inclined inwardly of the body at an acute angle to the axis of conduit 142, and converging to form the trailing ends 146. The nonslotted areas of body 114 lying between each trailing end 146 and the related end of conduit 142 define closure positions indicated at 147 (FIGS. 6 and 10) adapted to register with related flow ports 140 in the flowway-closing position of the closure member.

Body 114 is provided with oppositely extending coaxial cylindrical trunnions 122, either one of which may be the operating stem, which are mounted in coaxial openings 116 at diametrically opposite points in body 114 and project through coaxial tubular bosses 112—112 at diametrically opposite points on casing 110. The coincident axes of trunnions 122 and bosses 112 define the axis of rotation of the closure member which is coincident with a main axis of chamber 111 and is disposed at an acute angle to the conduit axis, which angle corresponds to that between the flowway axis and the main chamber axis.

As in the earlier described embodiment, total flow in the full-open position will be through conduit 142 (FIG. 4) and at any other open position will be partly through conduit 142 and partly through slots 144 (FIGS. 5 and 8) and will be substantially straight-line flow. In the fully closed position (FIG. 9) closure portions 147 will cover flow ports 140.

The symmetrical balanced construction of both the described embodiments permits the closure members to be turned end-for-end, if desired, so that either end may be connected to a suitable operator, which may be a wheel or other type manually operable handle or may be a power-driven operator well known in this art.

It will be understood that various changes and modifications may be made in the details of the illustrative embodiments within the scope of the appended claims, but without departing from the spirit of this invention.

What I claim and desire to secure by Letters Patent is:

1. A rotary control valve comprising:

a. a casing defining a closure-receiving chamber having a main axis and having openings communicating with said chamber at spaced points to define a flowway therethrough disposed at an acute angle to said main axis; and
b. a flow-control member rotatably disposed in said chamber comprising:
  i. a hollow body shaped to fit said chamber and having an axis of rotation coaxial with said chamber axis;
  ii. a tubular flow-conduit extending through said body generally at said acute angle with respect to said axis of rotation and opening through the wall of said body whereby the ends of the conduit will be in register with said openings at the full flowway-open position of said control member;
  iii. elongate slots through the wall of said body extending circumferentially of the body in opposite directions from the opposite ends of said flow-conduit, each of said slots being defined by walls converging toward their trailing ends;
  iv. said body having nonslotted portions between the trailing ends of said slots and the adjacent ends of said conduit defining closure portions adapted to close off the flowway openings in the flowway-closing position of the control member;
  v. said slots and the ends of said conduit cooperating with the related flowway openings to vary the effective cross-sectional area of the flowway in accordance with the angular position of the slots and conduit ends relative to said openings while maintaining substantially straight-line flow through the flowway at all valve-open positions; and
  vi. cylindrical trunnion members carried by the opposite ends of said body and journaled in said casing on said main axis.

2. A rotary control valve according to claim 1 wherein said flow-control member is of generally cylindrical shape.

3. A rotary control valve according to claim 1 wherein said flow-control member is of generally spherical shape.

4. A rotary control valve according to claim 1 wherein said walls of said slots are inclined at said acute angle with respect to said axis of rotation.

5. A rotary control valve according to claim 2 wherein said flow control member includes:
a. plug members removably closing the opposite ends of said body and carrying said trunnion members, and
b. at least one of said trunnion members being constructed to junction as an operating stem for said flow-control member.

6. A rotary control valve according to claim 1 wherein each of said slots has an arcuate length of from about 90° to about 270°.